United States Patent [19]

Tallant, II et al.

[11] 4,414,577

[45] Nov. 8, 1983

[54] MANUALLY GAIN PRESETTABLE KINESCOPE DRIVER IN AN AUTOMATIC KINESCOPE BIAS CONTROL SYSTEM

[75] Inventors: James C. Tallant, II; James Hettiger, both of Indianapolis, Ind.

[73] Assignee: RCA Corporation, New York, N.Y.

[21] Appl. No.: 398,632

[22] Filed: Jul. 15, 1982

[51] Int. Cl.³ .............................................. H04N 5/68
[52] U.S. Cl. ..................................... 358/242; 358/34
[58] Field of Search ................... 358/21 R, 34, 39, 33, 358/160, 242

[56] References Cited

U.S. PATENT DOCUMENTS

| | | | |
|---|---|---|---|
| 4,207,592 | 6/1980 | Harwood | 358/34 |
| 4,277,798 | 7/1981 | Hinn | 358/33 |
| 4,293,874 | 10/1981 | Reneau | 358/34 |

Primary Examiner—Richard Murray
Attorney, Agent, or Firm—Eugene M. Whitacre; Paul J. Rasmussen; Ronald H. Kurdyla

[57] ABSTRACT

A television receiver includes a DC coupled video output amplifier for supplying video signals to the cathode of an image reproducing kinescope, and an automatic kinescope bias (AKB) control system for maintaining a desired cathode black image current level. A video processor supplies video signals to the output amplifier via an input network including a manually adjustable resistor for pre-setting the amplifier gain. During AKB operating intervals, a substantially zero voltage drop is maintained across the adjustable gain control resistor so that the setting of the adjustable gain control resistor desirably has no influence on the kinescope cathode bias voltage monitored by the AKB system.

13 Claims, 1 Drawing Figure

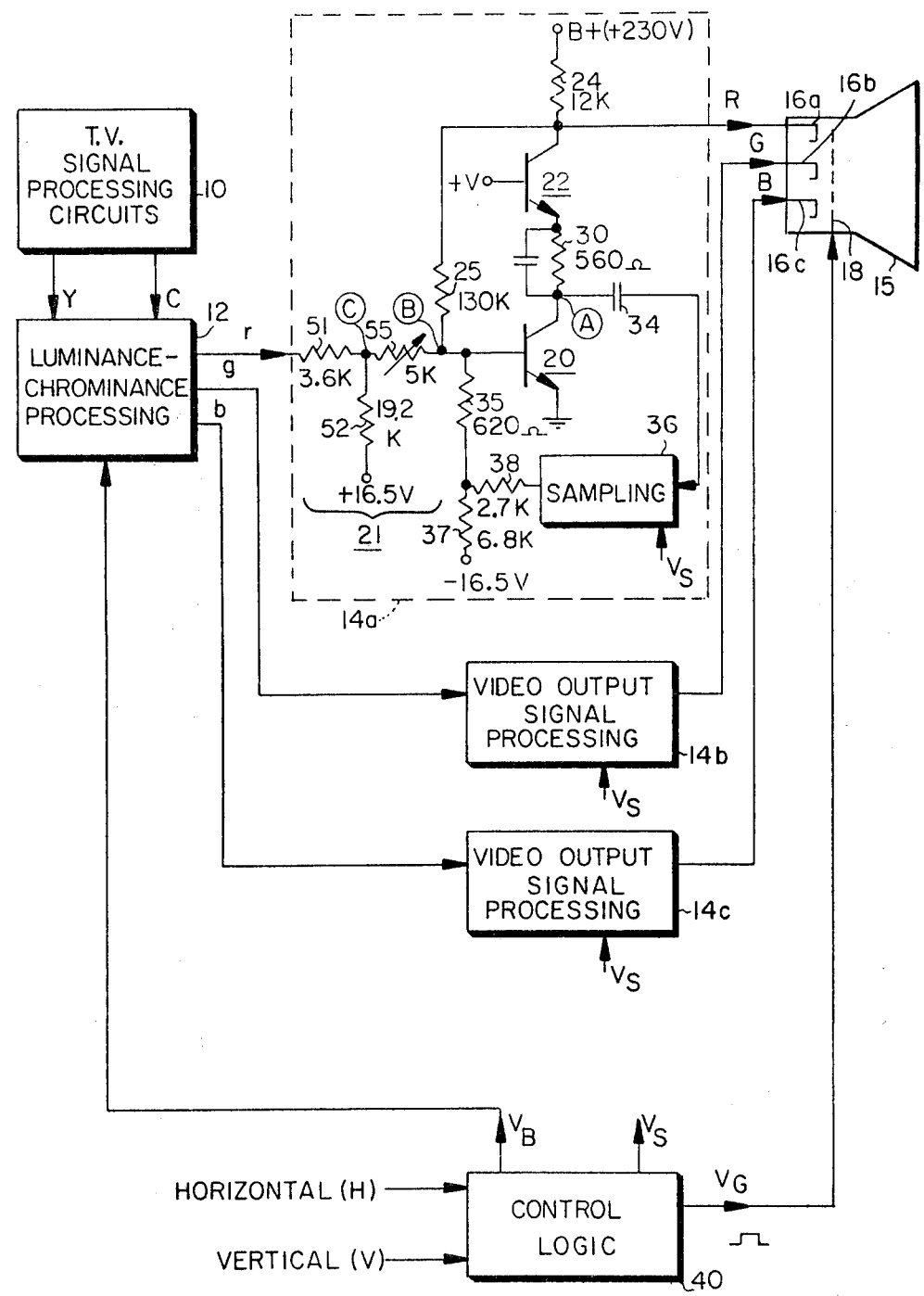

MANUALLY GAIN PRESETTABLE KINESCOPE DRIVER IN AN AUTOMATIC KINESCOPE BIAS CONTROL SYSTEM

This invention concerns a video display system such as a television receiver wherein the signal gain of a kinescope driver amplifier can be adjusted manually to a pre-set condition without inducing a response from an associated automatic kinescope bias (AKB) control network.

Television receivers sometimes employ an automatic kinescope bias (AKB) control system for automatically establishing the proper black image representative current levels for each electron gun of the kinescope. As a result of this operation, the reproduced picture is prevented from being adversely affected by variations of kinescope bias from a desired level (e.g., due to aging and temperature effects). One type of AKB system is disclosed in U.S. Pat. No. 4,263,622 of Werner Hinn, titled "Automatic Kinescope Biasing System."

An AKB system typically operates during image retrace blanking intervals, at which time the kinescope conducts a small black level representative blanking current in response to a reference voltage representative of black video signal information. This current is monitored by the AKB system to generate a correction voltage representing the difference between the sensed black current level and a desired black current level. The correction voltage is applied to video signal processing circuits preceding the kinescope with a sense for reducing the difference. Typically, the correction voltage is applied to a bias control input of a DC coupled kinescope driver amplifier which supplies video output signals of a level suitable for directly driving a cathode intensity control electrode of the kinescope. The correction voltage modifies the output bias voltage of the driver amplifier, thereby modifying the cathode bias voltage, such that the desired cathode black current level results.

The cathode bias voltage which establishes the black current is not uniform from one kinescope to another of the same type, or even from one electron gun to another of the same kinescope, due to manufacturing tolerances, aging, temperature effects and other factors. To provide appropriate black level control in view of these differences the AKB system must have adequate dynamic control range, or control loop gain. The design of an AKB system with respect to dynamic control range can be complicated in the case of a television receiver wherein video signals are applied to the kinescope driver stage via a DC coupled input network which includes a manually adjustable resistance for presetting the signal gain of the kinescope driver stage at a desired level. This adjustment is typically made during receiver manufacture, and afterwards when the receiver is serviced.

The preset kinescope driver gain adjustment can add an additional variable to the design of an AKB system when such gain adjustment, between minimum and maximum settings, increases the range of bias voltages exhibited at the output of the kinescope driver, and thereby at the kinescope cathode. This result requires that the dynamic range or control loop gain of the AKB system be great enough to account for this additional range factor. However, the greater control loop gain required in this instance is undesirable since it can lead to instability (e.g., oscillation) of the AKB control loop, thereby rendering the AKB system ineffective.

In accordance with the principles of the present invention, a system is disclosed wherein the presence of an adjustable gain determinative resistance of the type described does not require significant additional dynamic control range to be exhibited by the AKB system. During AKB operating intervals a prescribed fixed voltage is maintained across the adjustable resistance, independent of the actual setting of the adjustable resistance, so that the setting of the adjustable resistance has no influence on the input current or on the related output bias voltage of the kinescope driver during AKB intervals.

The single FIGURE of the drawing shows a portion of a color television receiver, including an AKB system with an associated kinescope driver amplifier according to the present invention.

Television signal processing circuits 10 provide separated luminance (y) and chrominance (C) components of a composite color television signal to a luminance-chrominance signal processor 12. Processor 12 includes luminance and chrominance gain control circuits, DC level setting circuits (e.g., comprising keyed black level clamping circuits), color demodulators for developing r-y, g-y and b-y color difference signals, and matrix amplifiers for combining the latter signals with processed luminance signals to provide low level color image representative signals r, g and b. These signals are amplified and otherwise processed by circuits within video output signal processing networks 14a, 14b and 14c, respectively, which supply high level amplified color image signals R, G and B to respective cathode intensity control electrodes 16a, 16b and 16c of a color kinescope 15. Networks 14a, 14b and 14c also perform functions related to the AKB operation, as will be discussed. In this example, kinescope 15 is of the self-converging in-line gun type with a commonly energized grid 18 associated with each of the electron guns comprising cathode electrodes 16a, 16b and 16c.

Since output signal processors 14a, 14b and 14c are similar in this embodiment, the following discussion of the operation of processor 14a also applies to processors 14b and 14c.

Processor 14a includes a kinescope driver stage comprising an input common emitter transistor 20 which receives video signal r from processor 12 via an input network 21, and an output high voltage common base transistor 22 which together with transistor 20 forms a cascode video driver amplifier. High level video signal R, suitable for driving kinescope cathode 16a, is developed across a load resistor in the collector output circuit of transistor 22. Direct current negative feedback for driver 20, 22 is provided by means of a resistor 25. The signal gain of cascode amplifier 20, 22 is primarily determined by the ratio of the value of feedback resistor 25 to the resistance value of input circuit 21. The feedback network provides a suitably low amplifier output impedance, and assists to stabilize the DC operating level at the amplifier output.

A sensing resistor 30 DC coupled in series with and between the collector-emitter paths of transistors 20, 22 serves to develop a voltage at a node A representing the level of kinescope cathode black current conducted during kinescope blanking intervals. Resistor 30 functions in conjunction with the AKB system of the receiver, which will now be described.

A control logic unit 40 responds to a horizontal synchronizing rate signal (H) and to a vertical synchronizing rate signal (V), both derived from deflection circuits of the receiver, for generating timing signals $V_B$, $V_S$ and $V_G$ which control the operation of the AKB function during periodic AKB intervals. Each AKB interval begins shortly after the end of the vertical retrace interval within the vertical blanking interval, and encompasses several horizontal line intervals also within the vertical blanking interval and during which video signal image information is absent as shown, for example, in the aforementioned patent of Werner Hinn, and in U.S. Pat. No. 4,277,798 of Werner Hinn.

Timing signal $V_B$ is generated shortly after the end of the vertical retrace interval, and exists for the duration of the AKB interval. This signal is applied to an input control terminal of luminance-chrominance processor 12 for causing the r, g and b outputs of processor 12 to exhibit a black image representative DC reference level corresponding to the absence of video signals. This can be accomplished by reducing the signal gain of processor 12 to substantially zero via the gain control circuits of processor 12 in response to signal $V_B$, and by modifying the DC level of the video signal processing path via the DC level control circuits of processor 12 to produce a black image representative reference level at the signal outputs of processor 12.

Timing signal $V_G$, a positive grid drive pulse, occurs during a prescribed portion of the AKB interval (e.g., during two horizontal line intervals within the vertical blanking interval). Sampling timing signals $V_S$ occur during the AKB interval for enabling sampling circuits within processors 14a, 14b and 14c to operate for developing an output DC bias control signal representative of the kinescope cathode black level current.

During the AKB interval, positive pulse $V_G$ forward biases grid 18 of the kinescope, thereby causing the electron gun comprising cathode 16a and grid 18 to increase conduction. The kinescope functions as a cathode follower in response to grid pulse $V_G$, wherein a similarly phased, positive polarity version of grid pulse $V_G$ appears at cathode 16a during the grid pulse interval. The amplitude of the cathode output pulse so developed is proportional to the level of cathode black current conduction (typically a few microamperes), but is somewhat attenuated relative to grid pulse $V_G$.

The induced positive cathode output pulse appears at the collector of transistor 22, causing the collector voltage to increase while the cathode pulse is present. This increase in voltage is coupled to the base input of transistor 20 via feedback resistor 25, causing the current conduction of transistor 20 to increase proportionally while the cathode pulse is present. The increased current conducted by transistor 20 causes a voltage to be developed across sensing resistor 30. This voltage is in the form of a negative voltage pulse which appears at a node A and which is proportional in magnitude to the magnitude of the black level representative cathode output pulse. The magnitude of this voltage pulse is determined by the product of the value of resistor 30 times the magnitude of the incremental current induced through resistor 30 via the feedback action of resistor 25.

The black current representative voltage pulse is coupled from node A via an AC coupling capacitor 34 to a sampling and control signal processing network 36. Sampling circuits within network 36 are enabled by sampling timing signals $V_S$ for developing a DC bias control signal proportional to the voltage sensed at node A. The bias control signal is stored (e.g., by means of a charge storage "holding" capacitor in network 36) until the next AKB interval, and is applied via a bias network comprising resistors 35, 37 and 38 to a bias control input at the base of transistor 20 for maintaining a desired cathode bias voltage corresponding to a desired black level cathode current. Illustratively, if the magnitude of the induced cathode output pulse corresponds to a condition of excessive black level current, the bias control signal changes in a less positive sense for reducing the base bias current of transistor 20. As a result, bias voltage for cathode 16a developed at the collector of transistor 22 increases to thereby reduce the black current level to the correct level.

Network 36 can employ signal sample and hold networks of the type described in U.S. Pat. No. 4,331,981, titled "Linear High Gain Sampling Amplifier", and in U.S. Pat. No. 4,331,982 titled "Sample and Hold Circuit Particularly for Small Signals", both incorporated herein by reference. Network 36 may also employ sampling and control voltage processing circuits of the type shown in U.S. Pat. No. 4,277,798 of Werner Hinn titled "Automatic Kinescope Biasing System with Increased Interference Immunity", also incorporated herein by reference.

It is noted that input signal coupling network 21 associated with kinescope driver 20, 22 comprises a fixed voltage divider including resistors 51 and 52, and a manually adjustable resistor 55. Resistor 55 is intended to be adjusted during receiver manufacture and during receiver service for pre-setting the signal gain of driver 20, 22 at a desired level.

The base voltage of continually conductive, grounded emitter input transistor 20 equals approximately +0.6 volts. This voltage, which is substantially fixed, corresponds to the voltage drop across base-emitter junction of transistor 20 and appears at a node B to which the "output end" of adjustable resistor 55 is connected. The "input end" of adjustable resistor 55 is coupled to a node C which corresponds to a tap on fixed voltage divider 51, 52. The values of voltage divider resistors 51, 52 are chosen so that, during the entire AKB interval when the black reference voltage appears at the "r" signal output of processor 12, the DC voltage developed by voltage divider action at node C (a voltage translated version of the black reference voltage from processor 12) substantially equals the DC voltage developed at node B. For example, the voltages at nodes B and C both equal approximately +0.6 volts with the circuit values shown and when the black reference voltage at the "r" output of processor 12 is approximately +3.8 volts.

Thus during AKB intervals the DC voltage on both sides of gain control resistor 55 are substantially equal, whereby a substantially zero voltage drop exists across gain control resistor 55 at this time. As a result, the setting of adjustable resistor 55 to any position between its extreme settings does not induce a change in the base bias current of transistor 20, nor a change in the kinescope cathode potential (at the collector of transistor 22) which would otherwise require additional dynamic control range (control loop gain) from the AKB system. The following discussion is illustrative of the effect produced by this arrangement.

As a practical matter, the cathode 16a bias potential for producing a desired black level current can vary over a range of approximately 45 volts (e.g., from +150 volts to +195 volts for a given grid potential), due to a variety of factors including aging, temperature effects, and kinescope manufacturing tolerances. Accordingly, the dynamic range and control loop gain of the AKB system must be great enough to accommodate this range of cathode potentials.

If the described voltage divider action of resistors 51, 52 to maintain the voltages at nodes C and D equal during the duration of $V_B$ is absent (e.g., by removing resistor 52) whereby a voltage drop is developed across gain control resistor 55 during AKB intervals, the input current of transistor 20 will change as the setting of resistor 55 is varied, and a proportional but undesirable change in the cathode potential provided at the collector of transistor 22 results. In this regard it is noted that feedback cascode amplifier 20, 22, 25 resembles an operational amplifier with a non-inverting input corresponding to the grounded emitter of transistor 20, an inverting input corresponding to the base of transistor 20, an output at the collector of transistor 22, and a signal gain determined by the ratio of the feedback impedance (resistor 25) between the output and inverting input to the input impedance determined by network 21. Accordingly, the amplifier output voltage at the collector of transistor 22 will adjust to whatever level is necessary to maintain the inverting input base voltage of transistor 20 substantially equal to the non-inverting input emitter voltage of transistor 20, less the substantially fixed base-emitter junction voltage drop of transistor 20. Thus the collector output voltage of transistor 22 will vary proportionally as input resistor 55 is adjusted.

The undesirable proportional changes of cathode potential in response to the setting of resistor 55 should be accommodated by the dynamic control range of the AKB system if effective black level cathode current control is to be accomplished. The increased range of cathode voltage variations caused by adjusting resistor 55 requires correspondingly increased AKB control loop gain. In some cases the additional gain required can be unmanageably high, and can lead to instability of the AKB control loop. In the absence of the described voltage divider action performed by resistors 51 and 52, varying resistor 55 between its extreme settings can produce an additional range of cathode bias voltage variations more than double the otherwise expected 45 volt range. In the illustrated embodiment, the additional range of cathode bias voltage variations can be on the order of 60 to 70 volts, subject to the self-limiting effects of the driver stage particularly at higher cathode voltage levels. In such case the total range of anticipated cathode bias voltage variation can be on the order of 105 to 115 volts, or approximately two and one-half times the otherwise expected range. Accordingly, the control loop gain of the AKB system must be increased greatly to accommodate the additional range of cathode voltage variations.

With the disclosed voltage divider arrangement according to the present invention, the undesirable additional cathode voltage range and the resulting need for greatly increased AKB control loop gain are not present, since gain control resistor 55 can be adjusted without producing an unwanted additional cathode voltage change to which the AKB system must respond. Thus the AKB control loop gain can be maintained at a lower, potentially less troublesome level.

Normally expected circuit tolerances prevent very precise matching of the equipotential voltages developed at nodes B and C across resistor 55. However, very precise matching of these potentials is not required as a practical matter.

It is noted that the voltage translating circuit including voltage divider resistors 51, 52 is not required in a system wherein the black reference voltage provided by the video signal processor during AKB intervals to the "input" of the gain control resistor equals the bias voltage present at the "output" of the gain control resistor. With regard to the illustrated arrangement, this corresponds to a situation wherein the r signal output from processor 12 is directly connected to node C and exhibits a reference voltage level of +0.6 volts during the AKB operating intervals, which equals the potential appearing at node B.

What is claimed is:

1. In a video signal processing system including an image reproducing device for displaying an image in response to video signals applied to an intensity control electrode thereof, said video signals including image information and blanking intervals, apparatus comprising:

means for providing video signals at an output thereof, said output exhibiting a black level reference voltage during video signal blanking intervals;

amplifier means for supplying video signals to said intensity control electrode;

a signal path for coupling said output of said signal providing means to said amplifier means during said image and blanking intervals;

adjustable means coupled to said signal path for determining the signal gain of said amplifier means in accordance with a current conduction characteristic of said adjustable means varying with the setting thereof, said intensity control electrode being undesirably subject to bias variations with variations in the setting of said adjustable means;

bias control means, operative during given intervals within video signal blanking intervals, for automatically controlling the bias of said image reproducing device in response to the bias condition of said intensity control electrode to maintain a desired level of black image representative current conducted by said intensity control electrode; and means for maintaining a prescribed conduction characteristic for said adjustable means, independent of its actual setting, during said given intervals when said bias control means is operative.

2. Apparatus according to claim 1, wherein said adjustable means comprises a variable resistance included in said signal path; and said maintaining means establishes a prescribed substantially fixed voltage across said variable resistance.

3. Apparatus according to claim 2, wherein said maintaining means establishes a substantially zero voltage differential across said variable resistance.

4. In a video signal processing system including a image reproducing device for displaying an image in response to video signals applied to an intensity control electrode thereof, said video signals including image information and blanking intervals, apparatus comprising:

means for providing video signals at an output thereof, said output exhibiting a black level reference voltage during video signal blanking intervals;

amplifier means for supplying video signals to said intensity control electrode;

a signal path for coupling said output of said signal providing means to said amplifier means during said image and blanking intervals;

adjustable means coupled to said signal path for determining the signal gain of said amplifier means in accordance with a current conduction characteristic of said adjustable means varying with the setting thereof, said intensity control electrode being undesirably subject to bias variations with variations in the setting of said adjustable means;

bias control means, operative during given intervals within video signal blanking intervals, for automatically controlling the bias of said image reproducing device in response to the bias condition of said intensity control electrode to maintain a desired level of black image representative current conducted by said intensity control electrode; and means for maintaining a prescribed conduction characteristic for said adjustable means, independent of its actual setting, during said given intervals when said bias control means is operative; wherein said amplifier means comprises a DC coupled driver amplifier having a first terminal for receiving video signals to be amplified from said video signal path, a second terminal coupled to an operating supply potential and to said intensity control electrode for supplying amplified video signals thereto, a third terminal coupled to a reference potential, and a direct current feedback network coupled from said second amplifier terminal to said first amplifier terminal.

5. Apparatus according to claim 4, wherein said adjustable means comprises a variable resistance included in said signal path; and said maintaining means establishes a prescribed substantially fixed voltage across said variable resistance.

6. Apparatus according to claim 5, wherein said maintaining means establishes a substantially zero voltage differential across said variable resistance.

7. Apparatus according to claim 6, wherein said maintaining means comprises a voltage translating circuit for providing to said variable resistance a translated version of said black level reference voltage exhibited by said video signal providing means during said video signal blanking intervals when said bias control means operates.

8. Apparatus according to claim 7, wherein said driver amplifier comprises an amplifier transistor; and said first, second and third amplifier terminals respectively correspond to base, collector and emitter terminals of said transistor.

9. In a video signal processing system including an image reproducing device for displaying an image in response to video signals applied to an intensity control electrode thereof, said video signals including image information and blanking intervals, apparatus comprising:

means for providing video signals at an output thereof, said output exhibiting a black level reference voltage during video signal blanking intervals.

amplifier means for supplying video signals to said intensity control electrode;

a signal path for coupling said output of said signal providing means to said amplifier means during said image and blanking intervals;

adjustable means coupled to said signal path for determining the signal gain of said amplifier means in accordance with a current conduction characteristic of said adjustable means varying with the setting thereof, said intensity control electrode being undesirably subject to bias variations with variations in the setting of said adjustable means;

bias control means, operative during given intervals within video signal blanking intervals, for automatically controlling the bias of said image reproducing device in response to the bias condition of said intensity control electrode to maintain a desired level of black image representative current conducted by said intensity control electrode; and means for maintaining a prescribed conduction characteristic for said adjustable means, independent of its actual setting, during said given intervals when said bias control means is operative; wherein said image reproducing device is a kinescope including an electron gun comprising a grid electrode and an associated intensity control cathode electrode;

said amplifier means comprises a DC coupled cascode amplifier including a first transistor with a first electrode for receiving video signals to be amplified from said video signal path, a second electrode, and a third electrode coupled to a reference potential;

a second transistor with a first electrode coupled to a bias voltage, a second electrode coupled to an operating supply potential and to said kinescope cathode for supplying amplified video signals thereto, and a third electrode coupled to said second terminal of said first transistor; and a direct current feedback network coupled from said second electrode of said second transistor to said first electrode of said first transistor.

10. Apparatus according to claim 9, wherein said adjustable means comprises a variable resistance included in said signal path; and said maintaining means establishes a prescribed substantially fixed voltage across said variable resistance.

11. Apparatus according to claim 10, wherein said maintaining means establishes a substantially zero voltage differential across said variable resistance.

12. Apparatus according to claim 11, wherein said maintaining means comprises a voltage translating circuit for providing to said variable resistance a translated version of said black level reference voltage exhibited by said video signal providing means during said video signal blanking intervals when said kinescope bias control means operates;

said first and second devices are like conductivity type devices; and said first, second and third electrodes of said first and second transistors respectively correspond to base, collector and emitter electrodes.

13. In a video signal processing system including an image reproducing device for displaying an image in response to video signals applied to an intensity control electrode thereof, said video signals including image information and blanking intervals, apparatus comprising:

means for providing video signals at an output thereof, said output exhibiting a black level reference voltage during video signal blanking intervals;

amplifier means for supplying video signals to said intensity control electrode;

a signal path for coupling said output of said signal providing means to said amplifier means;

adjustable means coupled to said signal path for determining the signal gain of said amplifier means in accordance with a current conduction characteristic of said adjustable means varying with the setting thereof, said intensity control electrode being undesirably subject to bias variations with variations in the setting of said adjustable means;

bias control means, operative during given intervals within video signal blanking intervals, for automatically controlling the bias of said image reproducing device in response to the bias condition of said intensity control electrode to maintain a desired level of black image representative current conducted by said intensity control electrode; and means responsive to a signal derived from said output of said video signal providing means for maintaining a prescribed conduction characteristic for said adjustable means, independent of its actual setting, during said given intervals when said bias control means is operative.

* * * * *